United States Patent [19]

Cannell

[11] 3,770,115
[45] Nov. 6, 1973

[54] PACKAGING CONTAINER FOR PIES
[76] Inventor: James N. Cannell, Columbus, Ohio
[22] Filed: Feb. 23, 1972
[21] Appl. No.: 228,606

[52] U.S. Cl............ 206/45.32, 206/45.34, 220/4 B, 220/97 R
[51] Int. Cl............................................ B65d 25/00
[58] Field of Search...................... 206/45.32, 45.34, 206/46 F, 46 FR, DIG. 2, 11; 220/4 B, 4 C, 220/4D, 8, 60, 97 R; 229/2.5

[56] References Cited
UNITED STATES PATENTS

| | | | |
|---|---|---|---|
| 3,620,403 | 11/1971 | Rump | 229/2.5 X |
| 2,246,695 | 6/1941 | Phillips | 206/DIG. 2 |
| 3,690,902 | 9/1972 | Dahl | 206/45.32 X |
| 3,434,625 | 3/1969 | Embry, Jr. | 220/97 R X |
| 2,138,364 | 11/1938 | Wassell | 206/45.32 |

Primary Examiner—William T. Dixson, Jr.
Assistant Examiner—Steven E. Lipman
Attorney—William V. Miller et al.

[57] ABSTRACT

A packaging container for shipping and displaying pies consisting of a shock-absorbing base shell of concave form which receives and supports the usual pie pan in such a manner that shocks will not be readily transmitted to the pie in the pan and a convex cover which snaps onto the base shell and grips the flange or rim of the pan. The cover is transparent so that the pie in the pan can be seen. The cover is of sufficient vertical extent or depth that it will cover the pie without contacting with the pie filling. The base shell and cover are complementally formed so that the container assemblies can be stacked without likelihood of being displaced laterally relatively, the shell of one assembly resting on and interfitting with the cover of the assembly next below. The base shell and cover are both formed to resist downward crushing forces.

7 Claims, 5 Drawing Figures

PACKAGING CONTAINER FOR PIES

Many types of packaging containers have been provided in the past to protect the pies during shipping or delivery and to display them after delivery. These containers have not adequately protected the pies from crushing and other damage, especially pies of the frozen type which are very fragile, such that shocks will break the crust or damage the filling, rendering the pies unsaleable. Usually prior art pie containers have consisted of a lower pan or shell of light, fragile and crushable material in which the pie is disposed and a film cover which can be easily bent downwardly into the pie filling to adhere thereto, damaging the filling or causing it to adhere to the cover when it is removed and even damaging the exposed part of the crust. The lower shell did not adequately resist vertical crushing forces or shock, due to setting the shell down on a support surface with excessive force. Stacking of these pie containers was not possible because they did not adequately resist downward crushing forces.

The present invention provides for adequately protecting the pie in the usual pan by supporting the pan in a lower pan-like base shell which is made of suitable shock-resistant material as well as being shaped to resist shock and downward crushing. A transparent cover is provided for telescoping over the shell and snapping onto it in locking relationship thereto and so as to grip the rim of the pie pan. This cover protects the pie from contamination but will show it attractively. This cover is so formed as to resist downward crushing and is of deep convex form so as not to contact with the underlying pie filling. Also, the bottom of the base shell is so shaped relative to the cover that, when the base shell of one package is stacked on the cover of another assembly, there is a centering and interfitting action which tends to prevent relative lateral displacement of the packages when stacked.

The best mode contemplated on carrying out this invention is illustrated in the attached drawings in which.

With specific reference to the drawings, the packaging container or assembly of this invention is illustrated as consisting of a base shell 11 and a cover 12. The base shell 11 is of pan-like form and is adapted to receive and support a pie pan 13 (FIGS. 4 and 5), usually metal, which contains the pie indicated schematically at P. The base shell is of concave form and sufficiently deep to receive the pie pan. The cover 12 is of inverted pan-like or convex form and is sufficiently deep or of sufficient vertical extent to enclose and protect the pie contained in the pan without contacting with the underlying pie filling, which usually projects in a dome-shaped contour above the level of the rim of the pie pan.

The base shell 11 is made of material which is of a shock-absorbing nature. Thus, it is particularly suitable for use with frozen pies. It has relatively heavy wall thicknesses and is so formed as to resist vertical crushing forces. It is preferably made of expanded styrofoam. Conversely, the cover 12, preferably has relatively thin wall thicknesses and is made of transparent plastic, preferably polyethylene, but it also is so formed as to resist vertical crushing forces.

Figure 1:
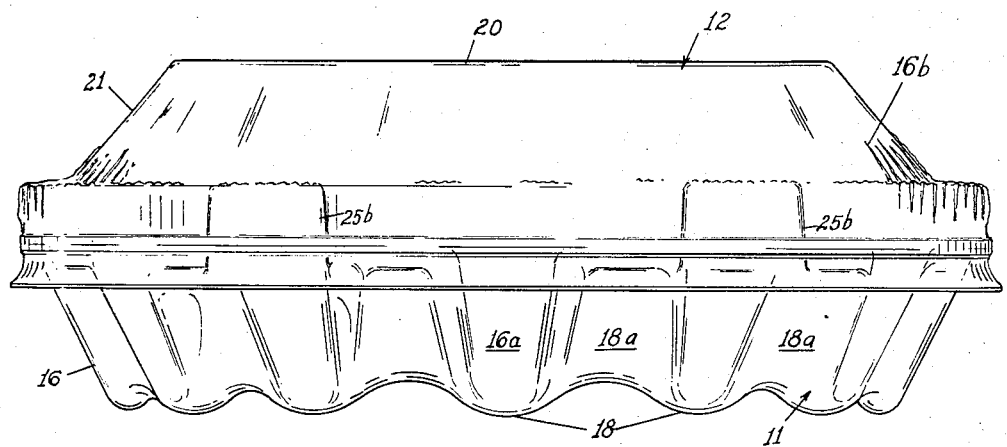
FIG. 1 is a side elevational view of the container assembly or package.
Figure 2:
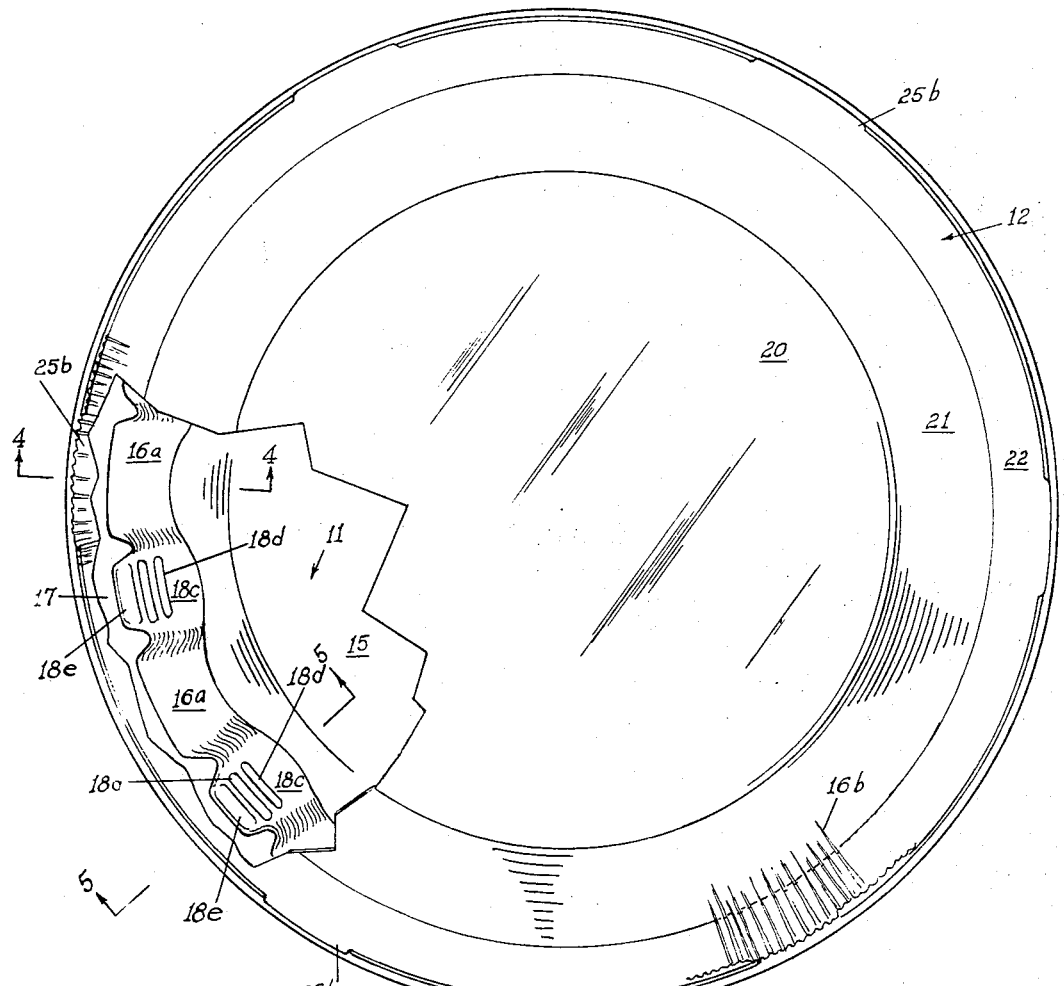
FIG. 2 is a top plan view, partly cut away, of the assembly.
Figure 3:
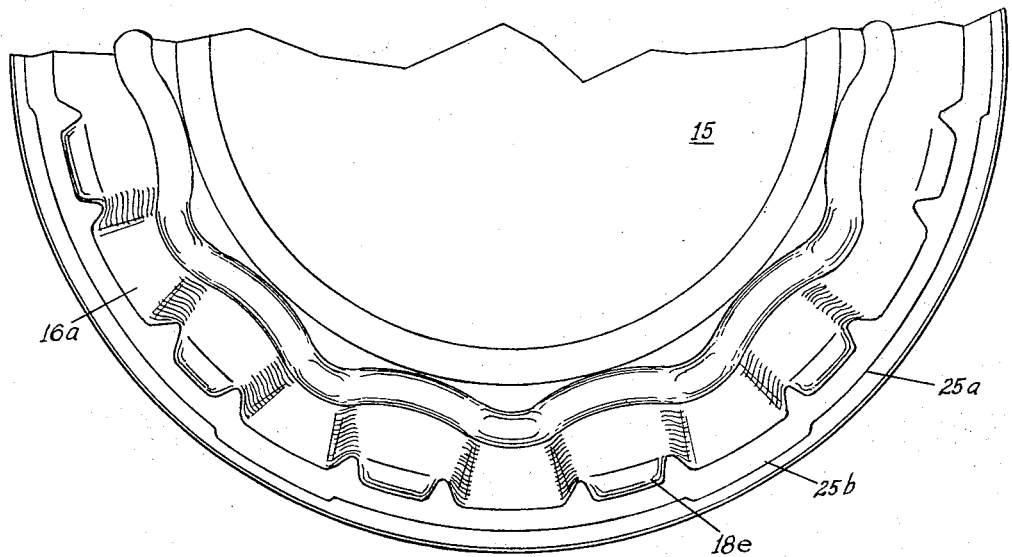
FIG. 3 is a partial bottom plan view of the assembly.
Figures 4, 5:
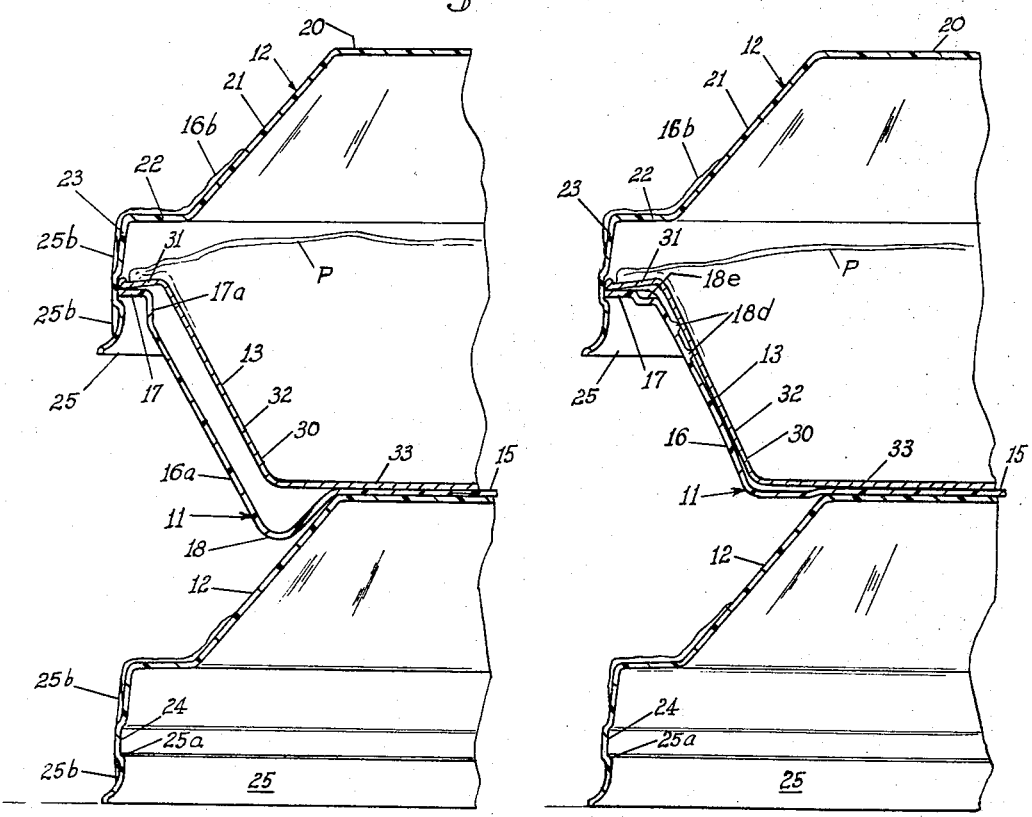
FIG. 4 is a vertical sectional view taken at the position indicated by line 4—4 of FIG. 2, but additionally showing the cover of a lower assembly.
FIG. 5 is a similar vertical sectional view taken at the position of line 5—5 of FIG. 2, and also showing the cover of a lower assembly.

The pan-like base shell 11 comprises a disc-like flat bottom 15 with an annular peripheral wall 16 integrally connected thereto and flaring outwardly and upwardly therefrom. At the upper extremity of the wall 16 an outwardly directed rim flange 17 is integrally formed on an upright wall section 17a. At angularly spaced positions around the exterior of the wall 16, vertically extending reinforcing and crush-resisting ribs 16a are provided and extend downwardly to provide a plurality of downward projections 18 which extend below the plane of the disc-like bottom 15. These crush-resistant projections 18 serve as shock-absorbing or cushioning means in contacting a supporting surface, as well as centering means when cooperating with a lid or cover 12 disposed beneath the shell (FIG. 4). The sides of the ribs 16a converge slightly downwardly and between these ribs are exterior recesses 18a (FIG. 1) which provide interior crush-resisting and reinforcing vertical lugs or ribs 18c (FIG. 2) which are angularly spaced uniformly around the interior of the wall. Vertically spaced pairs of transverse contact lips 18d are formed in the lugs 18c adjacent the upper ends thereof. Transverse dimples 18e are formed in the upper ends of the lugs 18c as reinforcement for adjacent portions of the flange 17 bridging the spaces between the upper ends of ribs 16a. The vertical ribs 16a and lugs 18c provide alternating exterior and interior crush-resisting and reinforcing ribs completely around the periphery of the shell base.

The cover 12 is of inverted pan-like convex form and preferably has a disc-like flat top 20 with an integral peripheral annular wall which includes an outwardly flared section 21, an outwardly directed horizontal section 22, and a depending annular flange 23. At the lower extremity of the flange 23 an outwardly flared guide skirt 25 is provided. Between the flange 23 and skirt 25 an inwardly directed annular groove 24 is provided. The cover 12 is of relatively thin material and to reinforce its depending peripheral wall, that wall is provided at regularly spaced intervals with vertical reinforcing ribs 16b formed therein and extending upwardly from a level just above the groove 24 through the flange 23, section 22 and into the wall section 21 but terminating before its junction to the disc 20. These ribs 16b will reinforce the wall section itself but it will still have a flexible junction with the disc 20 to permit the cover 12 to be forced downwardly over the flange 17 of the shell until the locking lips 25a at the lower side of the groove 24 snap under the outer edge of the flange 17 to lock the cover in place. During positioning of the cover, the flared guide skirt 25 centers the cover 12 relative to the base shell 11. At angularly spaced intervals the flange 23 is provided with outwardly formed vertically extending reinforcing areas 25b which will aid in resisting downward crushing forces on the flange. These areas extend through the groove 24 and the locking lips 25a are disposed therebetween.

In the use of this container assembly or package, the pie pan 30 with the pie P therein, is positioned in the shell 16 by slipping it downwardly thereinto until the flange or rim 31 thereof rests on the shell flange 17 (FIGS. 4 and 5). Usually the pie pan is made of thin aluminum. At this time, the flared wall 32 of the pie pan will be disposed along the flared wall 16 of the shell but its upper area will be spaced slightly therefrom by the vertically spaced horizontal lips 18d. Also, at this time, the flat bottom 33 of the pie pan will be in contact with the flat bottom 15 of the shell. The cover 12 can be positioned on the shell by telescoping its peripheral wall downwardly over the flange 17 of the peripheral wall of the shell and snapped in place as indicated. The flared skirt 25 will guide the cover onto the shell until it snaps in place. Both the edge of the shell flange 17 and pie pan flange 31 will snap into the locking groove 24. The cover peripheral side wall is of sufficient depth to locate the disc 20 well above the pie filling. The upstanding flange 23 will locate the horizontal section 22 well above the pie crust rim. The angularly spaced locking lips 25a along the bottom of groove 24 will snap beneath the flange 17 and provide a locking means for the cover whereas the top wall of the groove 24 will engage the flange 31 of the pie pan to hold it against shell flange 17 and support the cover.

When the package is rested or dropped on a support, the downward projections 18 engage that support and prevent shock to the pie. These projections locate the shell bottom 15 above that surface. Any downward forces on the package will be resisted both by the cover 12 and the base shell 11 due to the formation of each. Crushing of the cover is resisted by the vertical ribs 16b and the outset rib or lug areas 25b. Crushing of the base shell 11 will be resisted by the alternating exterior rib projections 16a and interior rib projections 18c. The pie pan 30 will snugly fit in the shell and will firmly engage the lips 18d, the bottom 33 being in flat contact with the shell bottom 15. The pie pan 30 will be held against vertical movement since its flange 31 along with the shell flange 17 are clamped together in groove 24. To remove the pie, it is merely necessary to engage the skirt 25 to move the locking lips 25a outwardly beyond the flange 17 so as to permit lifting of the cover 12. The downward projections 18 are arranged in a circle so that when a shell 11 is rested on a lower cover 12, the projections will contact the flared section 21 of the cover and provide a centering interfitting relationship between the shell and cover which facilitates stacking. In stacking, crushing will be prevented by the particular formation of the side walls of the cover 12 and shell 11.

Another function of the lips 18d is to prevent sticking together of adjacent shells 11 when they are supplied in nested relationship.

It will be apparent that the above described invention provides a pie package which will prevent crushing or damage to the pie contained therein. The pie pan will be held firmly in the shell so that it will not move vertically therein. Therefore, the top of the cover wall never engage and damge the top crust or filling. Also, the cover is so formed that its adjacent rim portion is spaced above the edge crust or rim of the pie and will not damage it. Stacking of a plurality of the packages will be possible due to their interfitting or interlocking action and to the fact that they are so formed as to resist downward crushing. Also, when the pie is in the package, it will be attractively displayed in a suitable manner.

Having thus described the invention what is claimed is:

1. A packaging container assembly for pies or the like comprising
   a pie pan having an upstanding side wall and a laterally outwardly projecting peripheral rim flange formed around the upper edge of said side wall;
   a pan-like concave lower base shell of shock-resisting material receiving said pie pan in nested relationship, said shell having a peripheral rim flange projecting laterally outward and underlying the rim-flange of said pie pan in contacting engagement therewith; and
   a convex-form cover positioned on said base shell in interfitting telescopic relationship, said cover having a peripheral side wall formed with an inwardly opening circumferential groove receiving and securing the peripheral rim-flanges of said pan and said base shell in releasable interlocked relationship.

2. A packaging container assembly according to claim 1 in which the peripheral side wall of said cover includes an outwardly flared guide skirt formed beneath said groove.

3. A packaging container assembly according to claim 1 wherein said cover side wall has a plurality of vertically-oriented, reinforcing ribs formed therein in circumferentially spaced relationship and extending upwardly from above said groove.

4. A packaging container assembly according to claim 1 wherein said base shell has a bottom wall on which said pie pan is disposed in supported relationship, and a peripheral side wall with a plurality of shock-absorbing projections angularly spaced around the periphery thereof, said shock-absorbing projections depending a distance downwardly from said bottom wall to engage a supporting surface.

5. A packaging container assembly according to claim 4 wherein said base shell peripheral side wall is formed with a plurality of outwardly directed, vertically oriented reinforcing ribs disposed around said peripheral side wall, in angularly spaced relationship, said shock-absorbing projections formed as continuations of said ribs.

6. A packaging container assembly according to claim 5 wherein the side walls of said pie pan and the peripheral side wall of said base shell are each outwardly flared toward their respective upper edges, said shell side wall having inwardly directed, horizontally disposed projections formed on the portions thereof intermediate said reinforcing ribs and which contactingly engage the sidewalls of said pie pan.

7. A packaging container according to claim 5 wherein said cover has a disc-like, horizontally disposed central portion and the peripheral side wall depends therefrom in outwardly flared relationship, said base shell bottom and shock-absorbing projections defining a convex space complemental to said cover to interfit therewith in vertical stacking of one container assembly on top of another.

* * * * *